United States Patent
Anderson et al.

(10) Patent No.: US 7,228,448 B2
(45) Date of Patent: Jun. 5, 2007

(54) METHOD FOR MAKING POWER SUPPLIES SMALLER AND MORE EFFICIENT FOR HIGH-POWER PCS

(75) Inventors: Jason Michael Anderson, Snoqualmie, WA (US); Adrian Mark Chandley, Sammanish, WA (US)

(73) Assignee: Microsoft Corporation, Redmond, WA (US)

(*) Notice: Subject to any disclaimer, the term of this patent is extended or adjusted under 35 U.S.C. 154(b) by 414 days.

(21) Appl. No.: 10/779,279

(22) Filed: Feb. 13, 2004

(65) Prior Publication Data
US 2005/0182986 A1  Aug. 18, 2005

(51) Int. Cl.
*G06F 1/00* (2006.01)
*G06F 11/30* (2006.01)

(52) U.S. Cl. ............... 713/340; 713/320; 713/322; 713/324

(58) Field of Classification Search ........ 713/300, 713/310, 320, 321, 323, 324, 330, 340
See application file for complete search history.

(56) References Cited

U.S. PATENT DOCUMENTS

| | | | |
|---|---|---|---|
| 5,638,541 A * | 6/1997 | Sadashivaiah | 713/323 |
| 6,105,142 A * | 8/2000 | Goff et al. | 713/324 |
| 6,298,448 B1 * | 10/2001 | Shaffer et al. | 713/322 |
| 6,553,500 B1 * | 4/2003 | Sterzik et al. | 713/300 |
| 6,618,762 B2 | 9/2003 | Fee et al. | 709/245 |
| 6,665,163 B2 | 12/2003 | Yanagisawa | 361/103 |
| 6,704,808 B2 | 3/2004 | Kasamatsu et al. | 710/2 |
| 6,996,734 B2 * | 2/2006 | Fiebrich et al. | 713/340 |
| 2001/0044332 A1 * | 11/2001 | Yamada et al. | 455/574 |
| 2003/0188208 A1 * | 10/2003 | Fung | 713/320 |
| 2005/0125703 A1 * | 6/2005 | Lefurgy et al. | 713/320 |

* cited by examiner

*Primary Examiner*—Thomas Lee
*Assistant Examiner*—James F. Sugent
(74) *Attorney, Agent, or Firm*—Woodcock Washburn LLP

(57) ABSTRACT

Systems and methods for reducing the size of a power supply in a computing device by monitoring activities to maintain the load on the power supply below a predetermined threshold. Through a set of software drivers, various components are placed into low power states in order to reduce the load on the power supply. The methods allow manufacturers to utilize smaller power supplies that are better fitted for the actual operating conditions of the computing device, rather than a large power supply designed for worst case conditions.

17 Claims, 4 Drawing Sheets

METHOD FOR MAKING POWER SUPPLIES SMALLER AND MORE EFFICIENT FOR HIGH-POWER PCS

FIELD OF THE INVENTION

This invention generally relates to the field of power management. More particularly, this invention relates to a system and method of reducing the size of a power supply in a computing device by providing a mechanism by which the power supply and the operating system communicate to mange power consumption of components within the computing device.

BACKGROUND OF THE INVENTION

Power supplies for desktop and mobile PCs contribute significantly to the overall size, heat and noise of a system. For example, a typical desktop PC intended for office includes a 250 W–300 W power supply (PSU). However, the actual power drawn by the system while running normal office desktop applications is typically 70–150 W, including a power supply loss of approximately 20–30%. If a PC could be delivered with, for example, a 150 W power supply, this would represent a saving in cost for the manufacturer, and a reduction in overall size of the power supply enabling smaller PCs. Alternatively, with such a reduction in overall wattage for the PSU, a manufacturer could choose an external power supply further reducing volume, heat and noise within the system.

Another example is notebooks, which tend to ship with large external power supplies that are designed to run the notebook in worst case scenarios, making them bulky and cumbersome when traveling. If the power supply was matched to the actual consumption of the system, then a much smaller supply could be provided or offered as a option. A typical notebook may have a 45 W power supply, yet the same notebook is able to run for 2 hours on a 25 WH battery, thus if managed properly, a very small 15 W power supply could provide adequate power to run the notebook.

Another related problem is efficiency. Because power supplies are designed to operate at maximum efficiency when under the maximum rated load, if that load is decreased, the efficiency decreases as well. When efficiency is lowered, unnecessary heat is generated through losses in the PSU. By decreasing the maximum rating of the PSU, efficiency increases at lower loads, thus reducing heat.

Thus, there is a need for an improved system for managing power consumption within a PC that will allow manufacturers to build PCs having smaller, more efficient power supplies that better represent the actual power demands of PCs. The present invention provides such a solution.

SUMMARY OF THE INVENTION

The present invention is directed to systems and methods for reducing the size of a power supply in a computing device. The present invention will allow manufacturers to utilize power supplies that are sized for actual operating conditions, rather than a worst case scenario. This will allow smaller power supplies to be used, which will increase operating efficiencies and reduce heat. According to one aspect of the invention, there is provided a method of managing power consumption within a computing device having an operating system. The method includes receiving a capacity of a power supply connected to the computing device; monitoring a power supply load to determine power consumption of components within the computing device; and if the power supply load is greater than a predetermined threshold value, reducing power consumption of predetermined components in order to maintain power consumption of the computing device below the capacity of the power supply.

According to a feature of the invention, reducing power consumption of the components may include monitoring a capacity of a battery connected to the computing device, and if the capacity is greater than a second predetermined threshold value, utilizing the battery as a secondary power source. Alternatively, a CPU load may be monitored to determine if the CPU load is above a threshold percentage, and if the CPU load is above the threshold percentage, clocking down the CPU to a lower frequency. Also, it may be determined if input/output operations are being serialized, and if the input/output operations are not being serialized, then serializing the input/output operations. Still further, it may be determined if a power management policy of the computing device is being enforced, and if the power management policy of the computing device is not being enforced, enforcing the power management policy. Additionally, the graphics processing unit or other system component may be clocked down.

According to another feature, a notification may be provided that the capacity of the power supply is reaching a maximum level and system performance will be reduced.

According to another aspect of the invention, there is provided a computing device having an operating system or If an small power supply is used, for example a travel power supply for notebooks, the system may for example operate at the equivalent or similar to the conventional maximum battery life modes other control program or process and a power supply adapted to report a capacity of the power supply to the operating system. The device includes a central processing unit, a graphics processing unit, a hard disk drive, and random access memory. The operating system monitors a load on the power supply to determine if the load is above a predetermined threshold, and reduces power consumption of predetermined components within the computing device in order to maintain power consumption of the computing device below the capacity of the power supply.

According to yet another aspect, there is provided a method of managing power consumption of components within a computing device having an operating system and a power supply. The method includes providing software drivers that each correspond to a respective component within the computing device, the software drivers being adapted to control power management functions of their respective components; receiving a capacity of the power supply; monitoring a load on the power supply to determine if the load is greater than a predetermined threshold value; and if the load is greater than the predetermined threshold value, requesting the software drivers to change to a lower power state of their respective devices.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention.

however, the invention is not limited to the specific methods and instrumentalities disclosed. In the drawings.

DETAILED DESCRIPTION OF PREFERRED EMBODIMENTS

Exemplary Computing Environment

Figure 1:
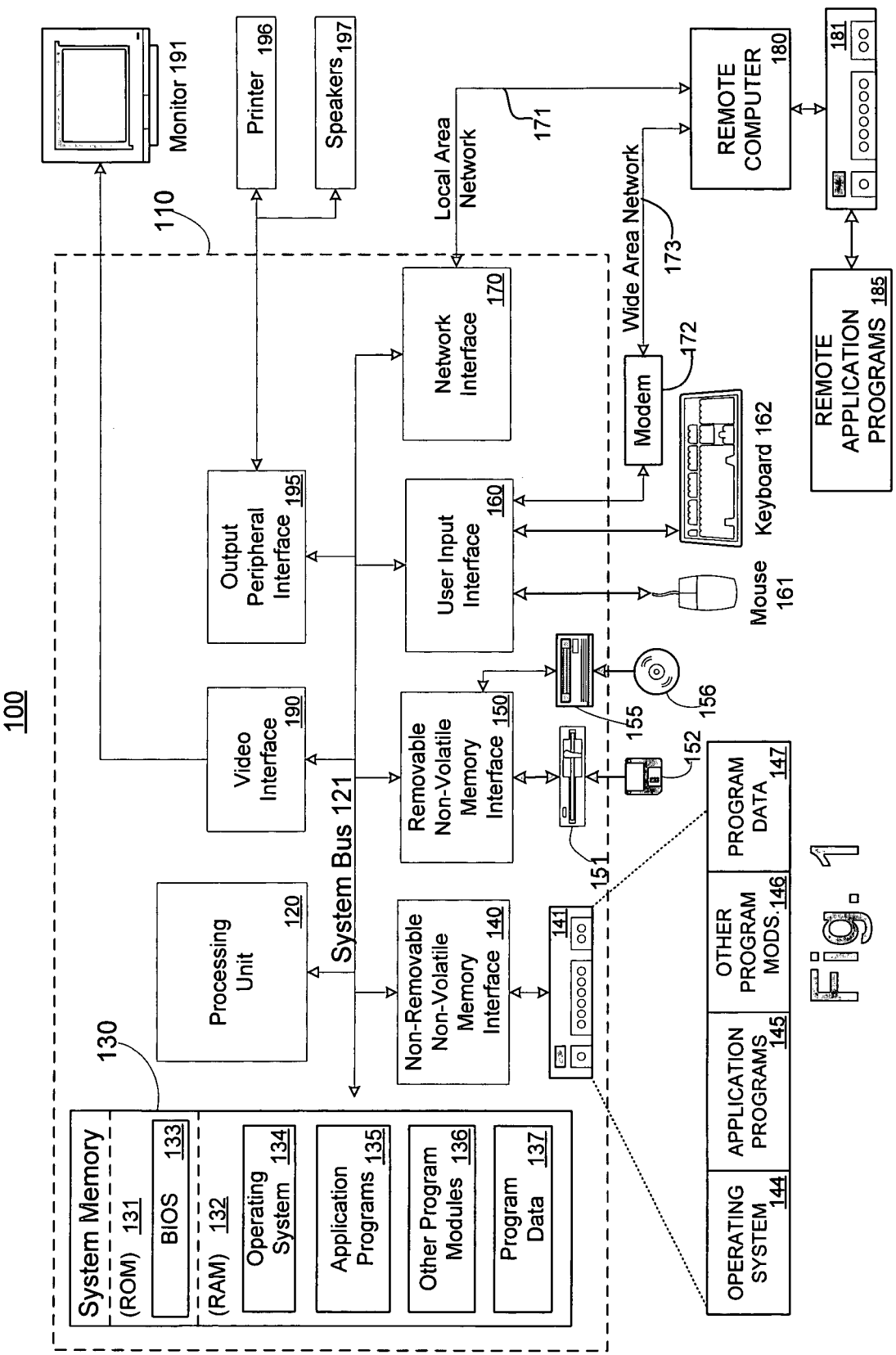
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus), Peripheral Component Interconnect Express (PCI-Express), and Systems Management Bus (SMBus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary System Having Smaller Power Supply

The present invention provides a mechanism by which the power supply and the operating system work together to ensure system stability even if the overall power consumption of the system at or beyond the capability of the power supply unit (PSU).

Figure 2:
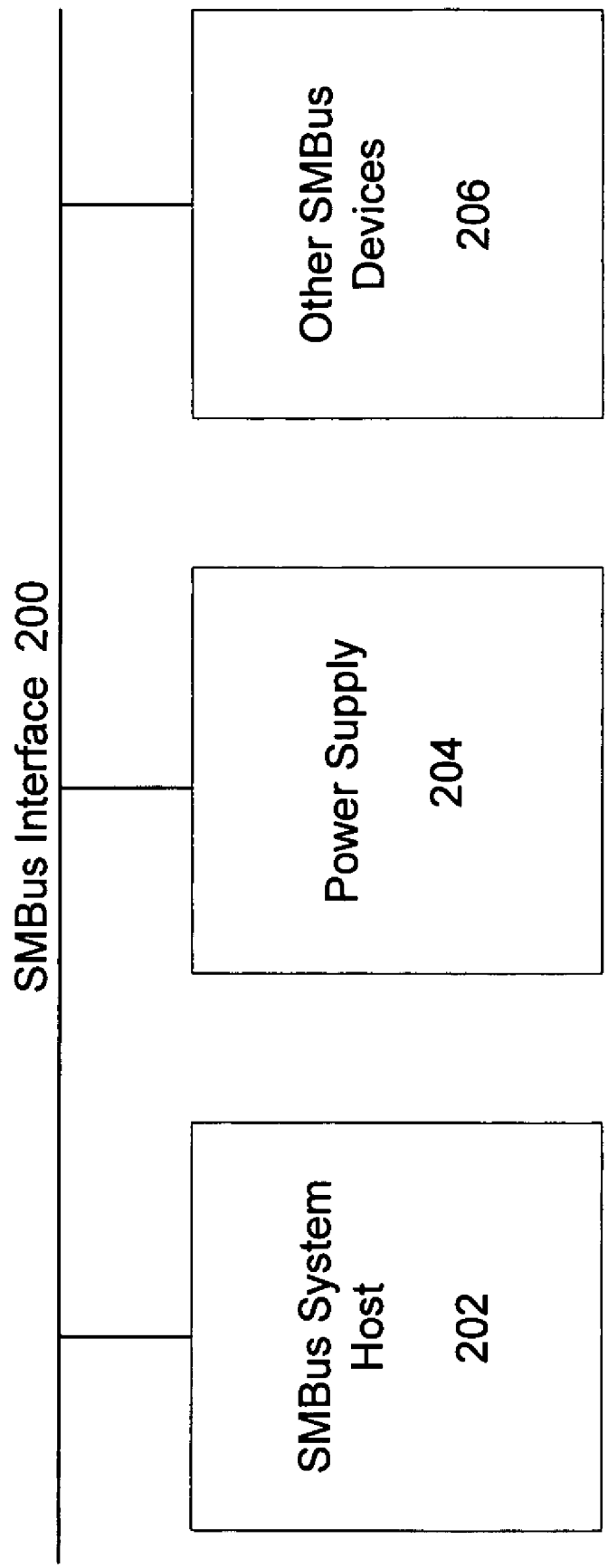
FIG. 2 is a block diagram showing an SMBus Interface and associated components.

Referring to FIG. 2, through an SMBus Interface 200, various components, including a system host (i.e., computer 110), power supply 204 and other devices 206 can communicate to control the system components (i.e., CPU, GPU, I/O devices, etc.). The SMBus interface is described in the "System Management Bus (SMBus) Specification," Version 2.0, Aug. 3, 2000, published by the SBS Implementers Forum, which is incorporated herein by reference in its entirety.

The power supply 204 may consist of a power supply unit that converts AC to DC, a battery, and an integral battery charger. The power supply 204 monitors particular environmental parameters to provide adequate information for power management and charge control regardless of the particular power supply unit's size, or the size and chemistry of the battery. The host 110 to power supply 204 communication is used to get data that is either presented to a user or to the host's 110 power management system. The user may obtain two types of data from the power supply: factual and predictive. Factual data can be measured, such as temperature or battery charge/discharge state, or it can be a battery characteristic, such as the battery's chemistry. Predictive data is calculated, based on the PSU's and battery's present state.

In accordance with the present invention, the power management system may query a device driver to determine if an action will cause harm to the system's integrity. For example, spinning up a disk drive while the power supply 204 is at maximum load may cause its output voltage to drop below acceptable limits, thus causing a system failure. In order to prevent this, the device driver needs information from the power supply that will yield desirable results. If the driver queries the power supply 204 and discovers that not enough power is available, it can then request that the power management system turn off a non-critical power use or change the power/performance operating point of system components.

The power supply (PSU) 204 has the ability to inform the host 110 of potentially critical conditions. These notifications represent an effort on the part of the power supply 204 to inform the host 110 that power is about to fail or that the battery charge is low. The power supply 204 expects that the user or host 110 will take the appropriate corrective action. Such critical notifications may originate from the power supply 204 using an SMBAlert to signal the host 110 that the power supply 204 state has changed.

The present invention provides a reporting path between the internal or external power supply and the system (i.e., OS plus system hardware). The PSU 204 is able to identify its capabilities and operating levels to the PC. As will be described with reference to FIG. 3, the operating system is able to take steps to either reduce the overall power consumption of the PC to ensure that the power supply does not reach its maximum load, or use power from an alternative power source such as a battery, to accommodate spikes in power consumption without exceeding the maximum rating of the power supply.

In accordance with the present invention, the operation system can turn off some devices, serialize power demanding operations (e.g. reading and writing to multiple devices), reduce processor (or GPU, etc.) speed and/or voltage, artificially slow the system down by forcing the CPU into a halt state for portions of each timer cycle, and/or notify the user that the power supply capacity is reaching maximum level and that system performance will be reduced. The PC also monitors activities that may cause power spikes, such as starting up a hard drive, and if the PSU is at an upper limit, the PC can throttle back other parts of the system while the drive is started.

The power supply 204 is rated to exceed the measured power needs of the computer as it operates through intended scenarios. Thus, the power supply 204 is not sized by adding the maximum power draw of all the system components plus a buffer. For example, a business desktop PC is measured for power consumption while running business applications rather than all components operating a maximum consumption.

If a small power supply is used, for example a travel power supply for notebooks, the system may for example operate at the equivalent or similar to the conventional maximum battery life modes, which keeps the overall power consumption to within the constraints of the attached power supply. This drastically reduces the size of the travel power supply, however, a user will most likely only be able to use such a small travel power supply for emergency power or charging, but perhaps not both at the same time.

Using a power supply 204 designed in accordance with the present invention, PCs will be expandable, as in conventional systems. However, if the system is loaded beyond the capabilities of the power supply 204, there may be a point when the computer will inform the user that a new or additional power supply may be necessary to maintain overall system performance.

Figure 3:
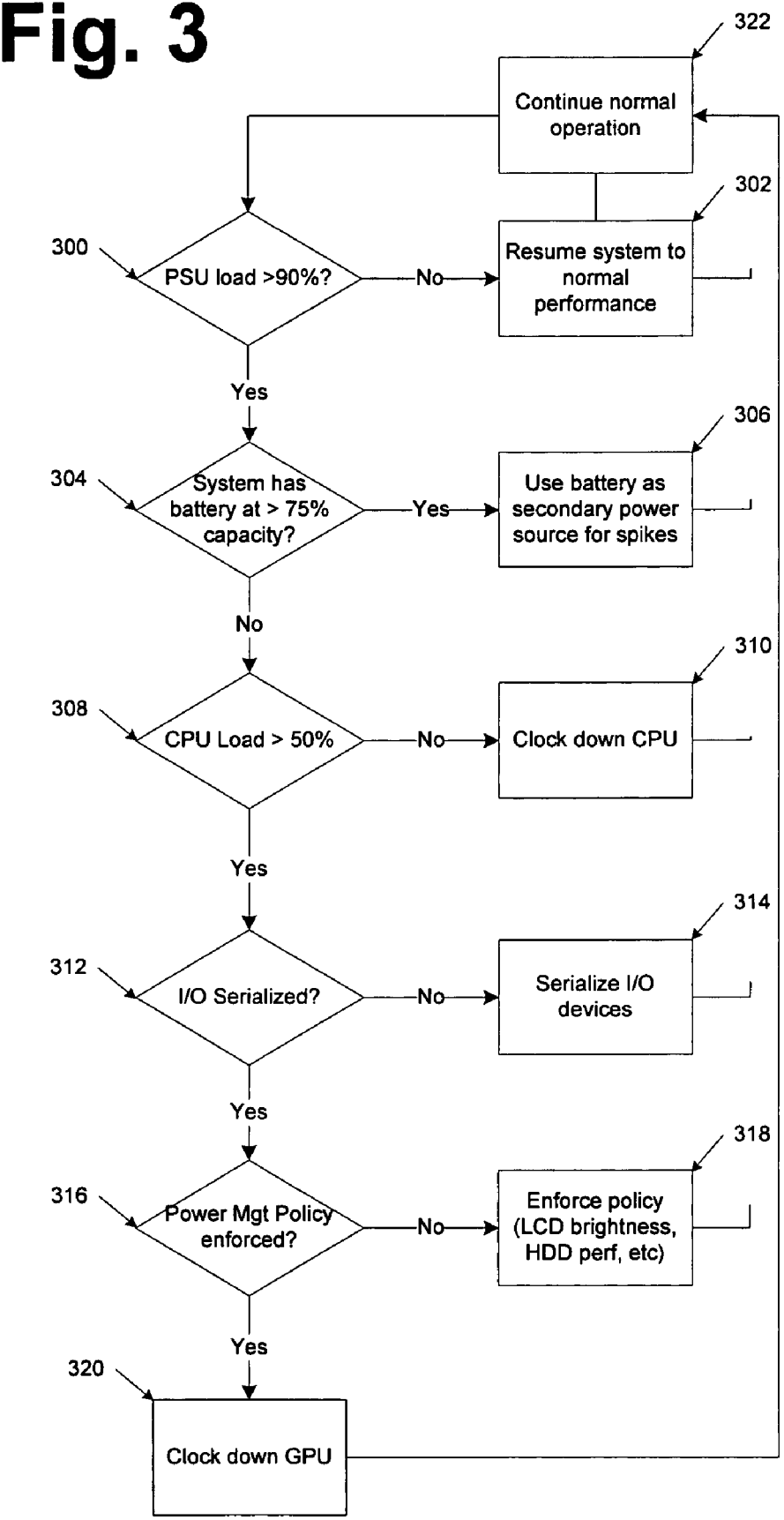
FIG. 3 is a flowchart illustrating the processing of the present invention.

FIG. 3 is an exemplary power management routine, which is executed by the host/computer 110 to manage power consumption within the computer. The routine executes in a loop that begins at step 300, where it is determined if the PSU load is greater than 90% of its reported capability. If not, then the system is maintained in a normal performance mode and the processing loops back to step 300.

If the PSU load is greater than, e.g., 90% of the reported capability at step 300, then it is determined at step 304 if the system has a battery capacity that is greater than 75%. If yes, then the battery is used as a secondary source of power at step 306. Otherwise, it is then determined if the CPU load is greater than, e.g., 50% at step 308. If not, then the CPU is clocked-down at step 310 to reduce power consumption.

If the CPU load is greater than, e.g., 50% at step 308, then at step 312 it is determined if the I/O is serialized. If not, then I/O operations are serialized at step 314 and processing continues at step 300. If it is determined that I/O operations are serialized at step 312, then it is determined if a power management policy should be enforced at step 316. The power management policy determines power management for peripherals, such as displays, PC cards, hard drives, etc. Typically, after a predetermined period of inactivity, peripherals are shut-down and/or placed into a reduced power state. If the decision at step 316 is yes, then at step 318 the power management policy is enforced. If not, then at step 320, the graphics processing unit is clocked-down in an effort to reduce power consumption.

It is noted that the percentages used in the description of FIG. 3 are for exemplary purposes only. The percentages may vary based on differing system components and system deployment.

Figure 4:
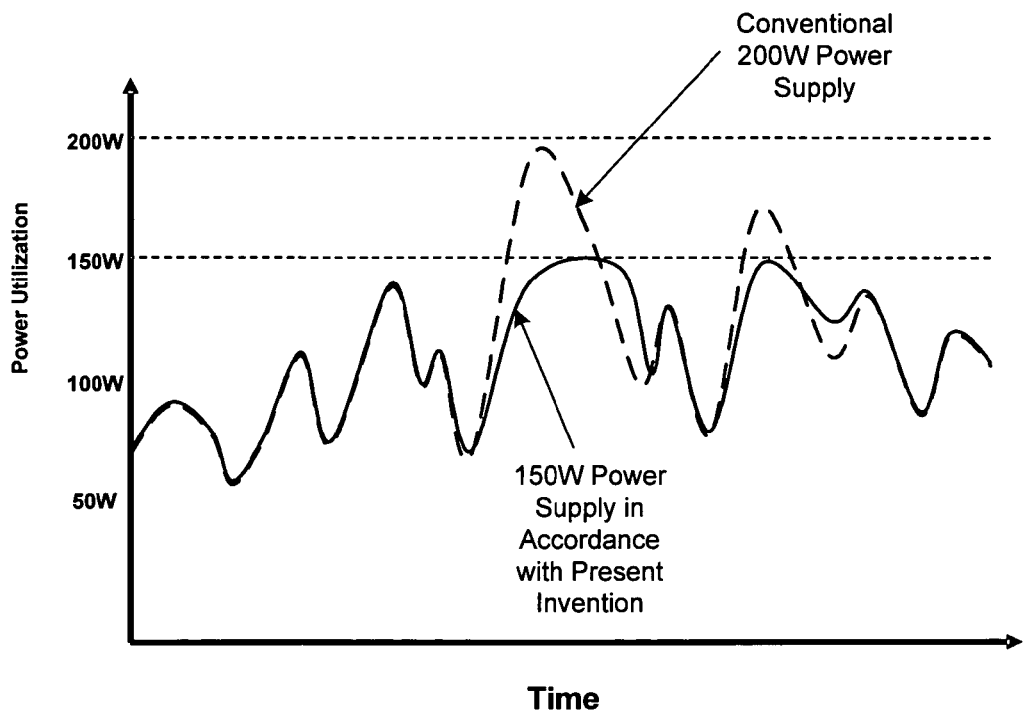
FIGS. 4–5 are graphs of power utilization over time and efficiency for a conventional power supply and a power supply in accordance with the present invention.

The process flow of FIG. 3 is implemented by the operating system and its associated component software drivers to limit power consumption to maintain the overall power consumption at or below the reported capacity of the PSU 204. Thus, it is possible to use a smaller power supply than in conventional systems because the overall system power demand is tightly managed. This is exemplified in FIGS. 4 and 5, wherein a conventional 200 W power supply and 150 W power supply in accordance with the present invention are contrasted. As noted above, a conventional power supply is designed to accommodate all of a computer's components running at maximum power consumption, plus a buffer. As shown in FIG. 4, a power supply designed in accordance with the present invention can be made smaller, and by implementing the power management routine of FIG. 3, the component power demand can be limited to the capacity of the smaller power supply unit.

Figure 5:
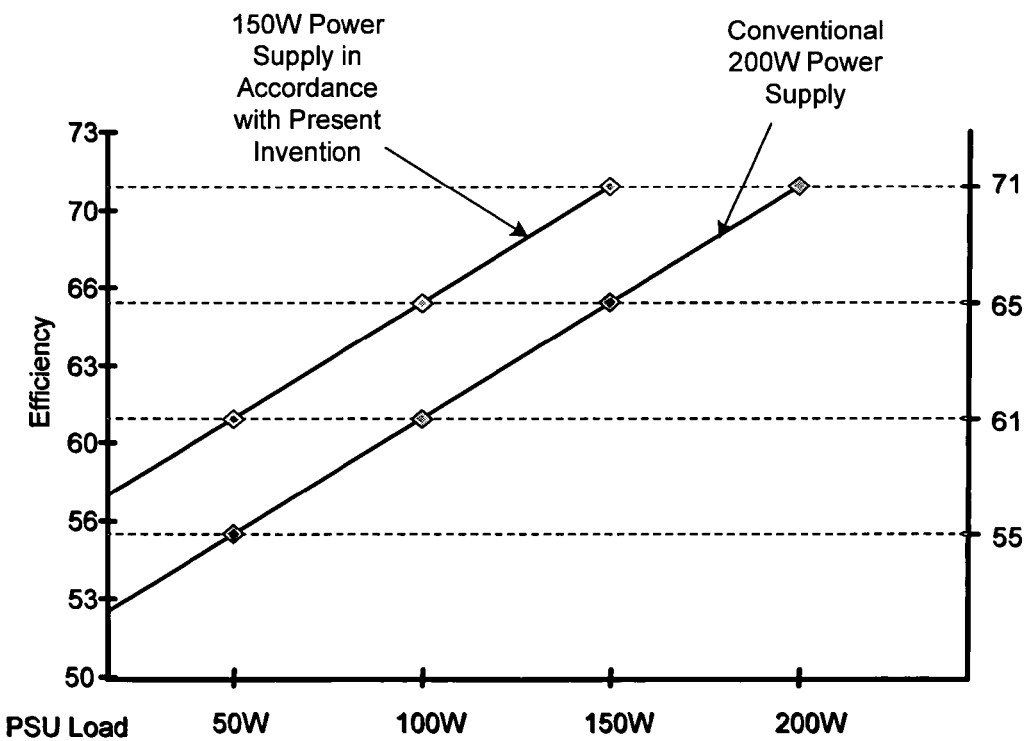

Another benefit of the present invention is that power supplies are more efficient when operating at or near their rated capacity. As shown in FIG. 5, the conventional supply does not run as efficiently as a power supply designed in accordance with the present invention for a given load. Because the typical computer 110 typically consumes far less than 200 W (i.e., the load is nearer to 150 W, as shown), using a smaller-rated power supply in conjunction with the present invention increases efficiency.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any computing device or environment, whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method of managing power consumption within a computing device having an operating system or other control program, said method comprising:
   receiving a capacity of a power supply connected to said computing device;
   monitoring a power supply load to determine power consumption of components within said computing device; and
   if the power supply load is greater than a predetermined threshold value, reducing power consumption of predetermined ones of said components in order to maintain power consumption of said computing device below the capacity of said power supply, wherein reducing power consumption of predetermined ones of said components further comprises monitoring a capacity of a battery connected to said computing device, and if the capacity is greater than a second predetermined threshold value, utilizing the battery as a secondary power source.

2. The method of claim 1, said reducing power consumption of predetermined ones of said components further comprising:
   monitoring a CPU load to determine if the CPU utilization is below a threshold percentage; and
   if the CPU utilization is below said threshold percentage, clocking down to a lower frequency, or otherwise reducing the performance and power consumption of the CPU.

3. The method of claim 2, said reducing power consumption of predetermined ones of said components further comprising:

determining if input/output operations are being serialized; and if the input/output operations are not being serialized, then serializing the input/output operations.

4. The method of claim 3, said reducing power consumption of predetermined ones of said components further comprising:

determining if a power management policy of said computing device is being enforced; and if the power management policy of said computing device is not being enforced, enforcing the power management policy.

5. The method of claim 4, said reducing power consumption of predetermined ones of said components further comprising clocking down a graphics processing unit.

6. The method of claim 1, further comprising providing a notification that the capacity of the power supply is reaching a maximum level and system performance will be reduced.

7. A computing device having an operating system and a power supply adapted to report a capacity of said power supply to said operating system, comprising:

a central processing unit (CPU);
a hard disk drive or other mass storage device;
random access memory; and
wherein said operating system monitors a load on said power supply to determine if the load is above a predetermined threshold, and
wherein said operating system reduces power consumption of predetermined ones of components within said computing device in order to maintain power consumption of said computing device below the capacity of said power supply, wherein said operating system monitors a capacity of a battery connected to said computing device, and if the capacity is greater than a second predetermined threshold value, utilizes the battery as a secondary power source.

8. The computing device of claim 7, wherein said operating system monitors a CPU load to determine if the CPU utilization is below a threshold percentage, and wherein if the CPU utilization is below said threshold percentage, clocks down to a lower frequency, or otherwise reduces the performance and power consumption of the CPU.

9. The computing device of claim 8, wherein said operating system determines if input/output operations are being serialized, and if the input/output operations are not being serialized, then serializes the input/output operations.

10. The computing device of claim 9, wherein said operating system determines if a power management policy of said computing device is being enforced, and if the power management policy of said computing device is not being enforced, enforces the power management policy.

11. The computing device of claim 10, further comprising a graphics processing unit (GPU), and wherein said operating system clocks down, or otherwise reduces the performance and power consumption of said GPU or other peripherals.

12. The computing device of claim 7, wherein said operating system provides a notification that the capacity of the power supply is reaching a maximum level and system performance will be reduced.

13. A method of managing power consumption of components within a computing device having an operating system and a power supply, the method comprising:

providing software drivers that each correspond to a respective component within the computing device, the software drivers being adapted to control power management functions of their respective components;

receiving a relative or absolute capacity of the power supply;

monitoring a load on the power supply to determine if the load is greater than a predetermined threshold value;

if the load is greater than the predetermined threshold value, requesting the software drivers to change to a lower power state of their respective devices;

querying for a capacity of a battery connected to said computing device; and if the capacity is greater than a second predetermined threshold value, utilizing the battery as a secondary power source.

14. The method of claim 13, further comprising:

querying for a CPU load to determine if the CPU load is above a threshold percentage; and if the CPU load is above said threshold percentage, clocking down the CPU to a lower frequency.

15. The method of claim 13, further comprising:

serializing the input/output operations.

16. The method of claim 13, further comprising enforcing a power management policy to reduce the performance and power consumption of peripherals.

17. The method of claim 13, further comprising clocking down said GPU.

* * * * *